(12) United States Patent
Jailani

(10) Patent No.: US 11,245,644 B2
(45) Date of Patent: Feb. 8, 2022

(54) AUTOMATIC MULTI-CHASSIS LINK AGGREGATION CONFIGURATION

(71) Applicant: SUPER MICRO COMPUTER, INC., San Jose, CA (US)

(72) Inventor: Sahul Hameed Abdul Kader Jailani, San Jose, CA (US)

(73) Assignee: Super Micro Computer, Inc., San Jose, CA (US)

( * ) Notice: Subject to any disclaimer, the term of this patent is extended or adjusted under 35 U.S.C. 154(b) by 493 days.

(21) Appl. No.: 15/875,044

(22) Filed: Jan. 19, 2018

(65) Prior Publication Data

US 2019/0230052 A1 Jul. 25, 2019

(51) Int. Cl.
*H04L 12/935* (2013.01)
*H04L 12/709* (2013.01)

(52) U.S. Cl.
CPC ........ *H04L 49/3054* (2013.01); *H04L 45/245* (2013.01)

(58) Field of Classification Search
USPC ........................................................ 370/420
See application file for complete search history.

(56) References Cited

U.S. PATENT DOCUMENTS

| | | | |
|---|---|---|---|
| 2012/0033668 A1* | 2/2012 | Humphries | H04L 45/245 370/390 |
| 2012/0320926 A1* | 12/2012 | Kamath | H04L 45/66 370/401 |
| 2014/0133486 A1* | 5/2014 | Sivasankar | H04L 47/41 370/392 |
| 2014/0189094 A1* | 7/2014 | Ditya | H04L 45/245 709/224 |
| 2014/0369186 A1* | 12/2014 | Ernstrom | H04L 41/0668 370/228 |
| 2015/0312088 A1* | 10/2015 | Ramakrishnan | H04L 41/30 370/218 |
| 2016/0234091 A1* | 8/2016 | Emmadi | H04L 41/0893 |

\* cited by examiner

*Primary Examiner* — Gregory B Sefcheck
*Assistant Examiner* — Majid Esmaeilian
(74) *Attorney, Agent, or Firm* — Patrick D. Benedicto

(57) ABSTRACT

A computer network includes a server computer having communication ports that are wired to switch ports of two separate network switches. The network switches receive link aggregation control packets from the server computer, and automatically aggregate corresponding switch ports into a single logical port channel based on contents of the control packets.

10 Claims, 6 Drawing Sheets

AUTOMATIC MULTI-CHASSIS LINK AGGREGATION CONFIGURATION

BACKGROUND OF THE INVENTION

1. Field of the Invention

The present invention relates generally to computer systems, and more particularly but not exclusively to computer networks.

2. Description of the Background Art

A network device, such as a server computer or a network switch, has a communication port that may be linked to a communication port of another network device. For example, a server computer may have a communication port in the form of a network interface card (NIC) port. Network switches have communication ports in the form of switch ports. The NIC port of a server computer may be linked to a switch port of a network switch to allow transmission of network traffic between the server computer and the network switch over the link. The network switch may have another switch port that is connected to a switch port of another network switch or to a NIC port of another server computer. Generally speaking, network traffic between server computers may pass through one or more switches over links. The links between communication ports are wired connections.

For redundancy and increased bandwidth, two or more links may be aggregated together as a single logical link. However, setting up communication ports for link aggregation is relatively complicated, tedious, and error-prone.

SUMMARY

In one embodiment, a computer network includes a server computer having communication ports that are wired to switch ports of two separate network switches. The network switches receive link aggregation control packets from the server computer, and automatically aggregate corresponding switch ports into a single logical port channel based on contents of the control packets.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
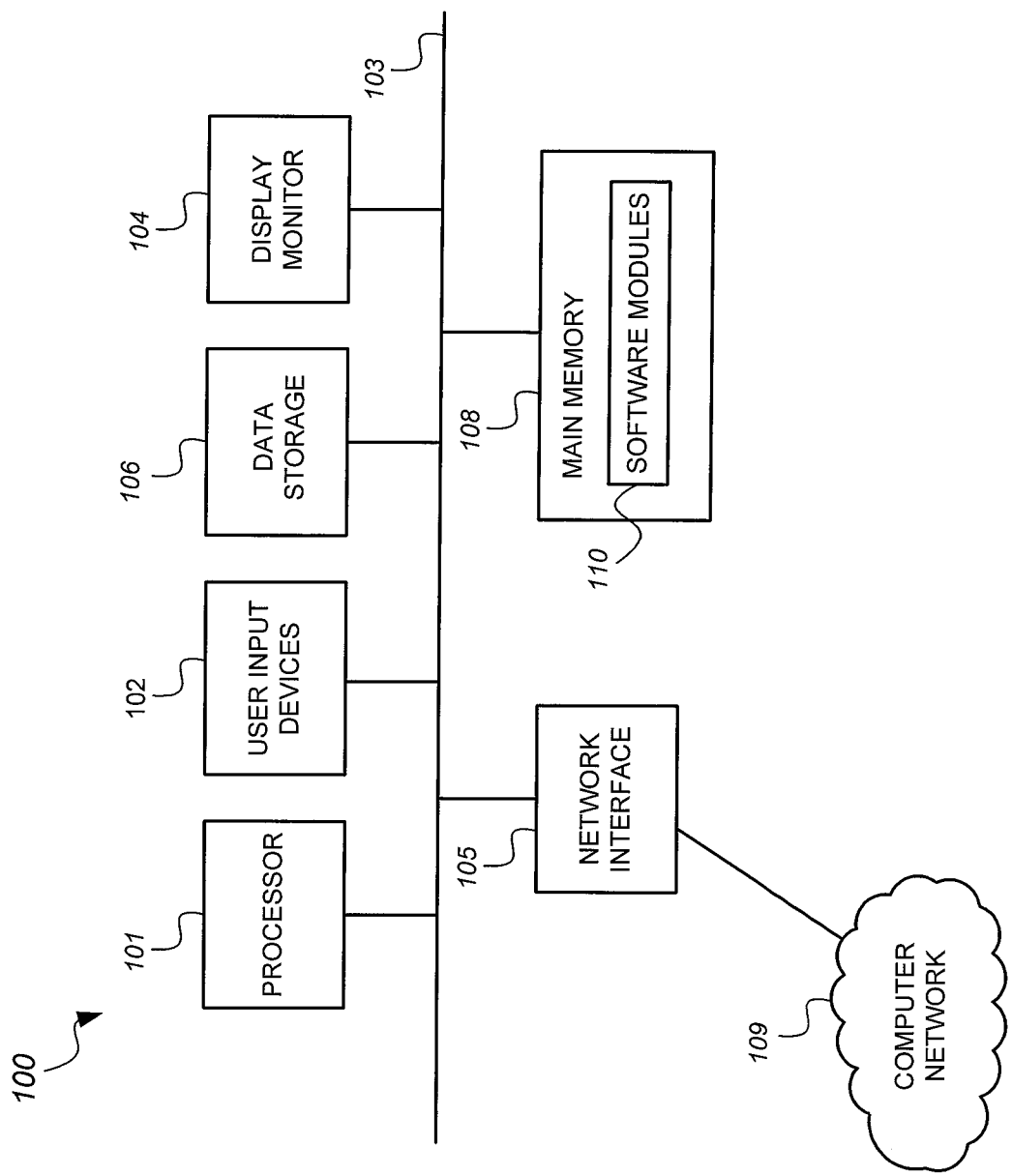
FIG. 1 shows a schematic diagram of a computer system that may be employed with embodiments of the present invention.

Referring now to FIG. 1, there is shown a schematic diagram of a computer system 100 that may be employed with embodiments of the present invention. The computer system 100 may be employed as a network switch or other computers described below. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110. In the example of FIG. 1, the software modules 110 comprise aggregation modules when the computer system 100 is employed as a network switch.

Figure 2:
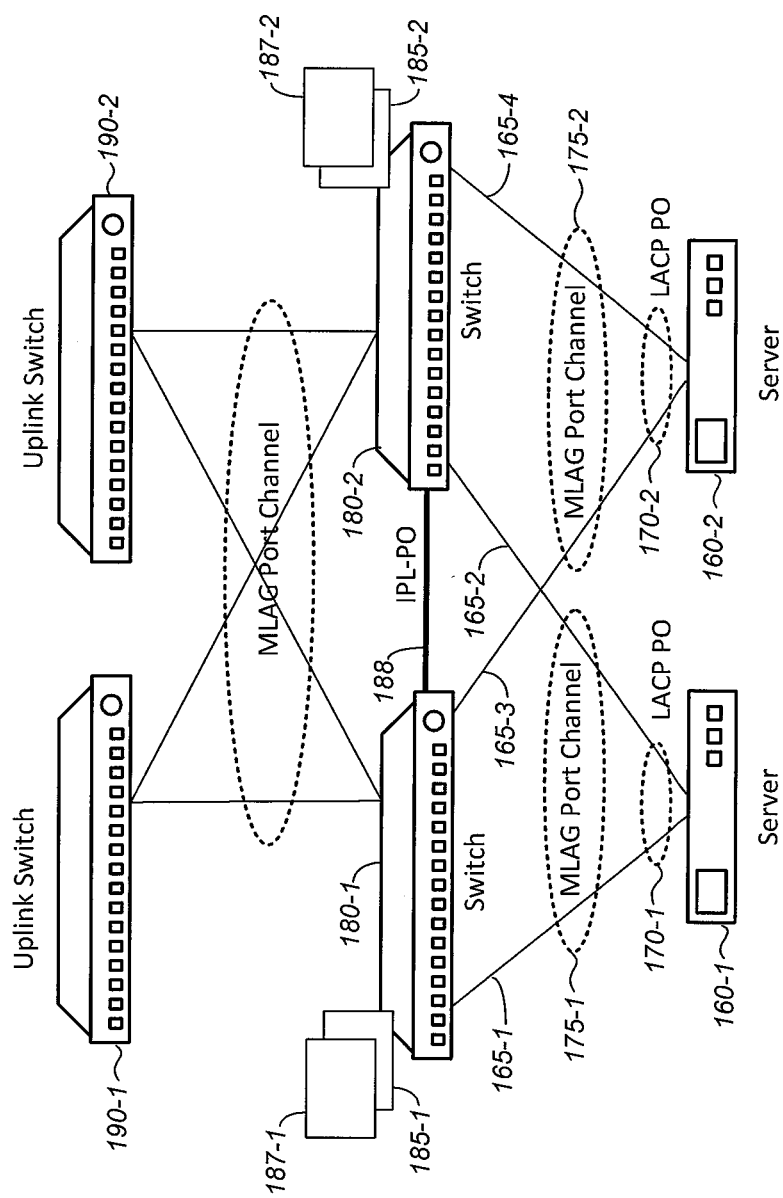
FIG. 2 shows a logical diagram of a computer network in accordance with an embodiment of the present invention.

FIG. 2 shows a logical diagram of a computer network in accordance with an embodiment of the present invention. In one embodiment, the computer network comprises one or more server computers 160 (160-1, 160-2, . . . ), a plurality of network switches 180 (180-1, 180-2, . . . ), and one or more network switches 190 (190-1, 190-2, . . . ).

A network switch 190 is also referred to as an uplink network switch in that the network switch 190 is downstream of the network switches 180 relative to the server computers 160. A network switch 190 may be a conventional network switch, such as those available from Cisco Systems Inc. and other network device vendors. Generally speaking, a network switch, such as a network switch 190 or 180, is adapted to receive, process, and forward data packets by packet switching. As will be more apparent below, a network switch 180 is further adapted to perform automatic multi-chassis link aggregation configuration.

A server computer 160 may comprise a conventional server computer, such as those available from Super Micro Computer, Inc. of San Jose, Calif. In one embodiment, a plurality of server computers 160 and a plurality of network switches 180 are mounted in the same equipment rack. In that embodiment, the server computers 160 comprise blade servers. The switches 190 may also be installed in the same equipment rack as the servers 160 and network switches 180. It is to be noted that only two server computers 160, two network switches 180, and two network switches 190 are shown in FIG. 2 for illustration purposes. The number of network devices that may be incorporated in embodiments of the present invention depends on the particulars of the computer network.

A link is a physical connection that connects communication ports of network devices. In the example of FIG. 2, a link 165 (165-1, 165-2, 165-3, 165-4, . . . ) connects a network interface card (NIC) port of a server computer 160 to a switch port of a network switch 180. A link 165 may comprise an Ethernet cable, a backplane connection, or other wired connection between a server computer 160 and a network switch 180. In one embodiment, the computer network of FIG. 2 allows for link aggregation in accordance with the Link Aggregation Control Protocol (LACP). Other link aggregation protocols may also be used without detracting from the merits of the present invention.

In the example of FIG. 2, the links 165-1 and 165-2 are connected to NIC ports of the server computer 160-1 that are aggregated together as a single LACP port channel aggregation (PO) 170-1. The port channel aggregation 170-1 combines the links 165-1 and 165-2 into a single logical link. Accordingly, data packets (or other network traffic) addressed to the port channel may be transported over the link 165-1 or 165-2. Similarly, the links 165-3 and 165-4 are connected to NIC ports of the server computer 160-2 that are aggregated together as a single LACP port channel aggregation 170-2, combining the links 165-3 and 165-4 into a single logical link.

Generally speaking, two or more links 165 may be aggregated into a single logical link by teaming or bonding their corresponding NIC ports together at a server computer 160. During the NIC teaming/bonding procedure, an administrator manually configures two or more NICs of a server computer 160 to form a single port channel. Data addressed to the port channel may be transported through NIC ports (and thus links 165) that are members of the port channel aggregation.

In one embodiment, the network switch 180-1 and the network switch 180-2 are physically separate network devices, each with its own separate chassis. For improved fault tolerance, two or more links 165 may be aggregated together to two or more network switches 180 in a so-called multi-chassis link aggregation (MLAG). MLAG involves combining two or more switch ports of separate network switches into a single MLAG port channel. In the example of FIG. 2, to aggregate the links 165-1 and 165-2 into a single logical link, the switch port of the network switch 180-1 connected to the link 165-1 and the switch port of the network switch 180-2 connected to the link 165-2 are setup to form an MLAG port channel aggregation 175-1. Similarly, the switch port of the network switch 180-1 connected to the link 165-3 and the switch port of the network switch 180-2 connected to the link 165-4 are setup to form an MLAG port channel aggregation 175-2. Links between the network switches 180 and uplink network switches 190 may also be aggregated in the same manner. Switch ports that belong to particular port channel aggregations are indicated in an aggregation table 185 (185-1, 185-2, . . . ) of a network switch 180.

Figure 3:
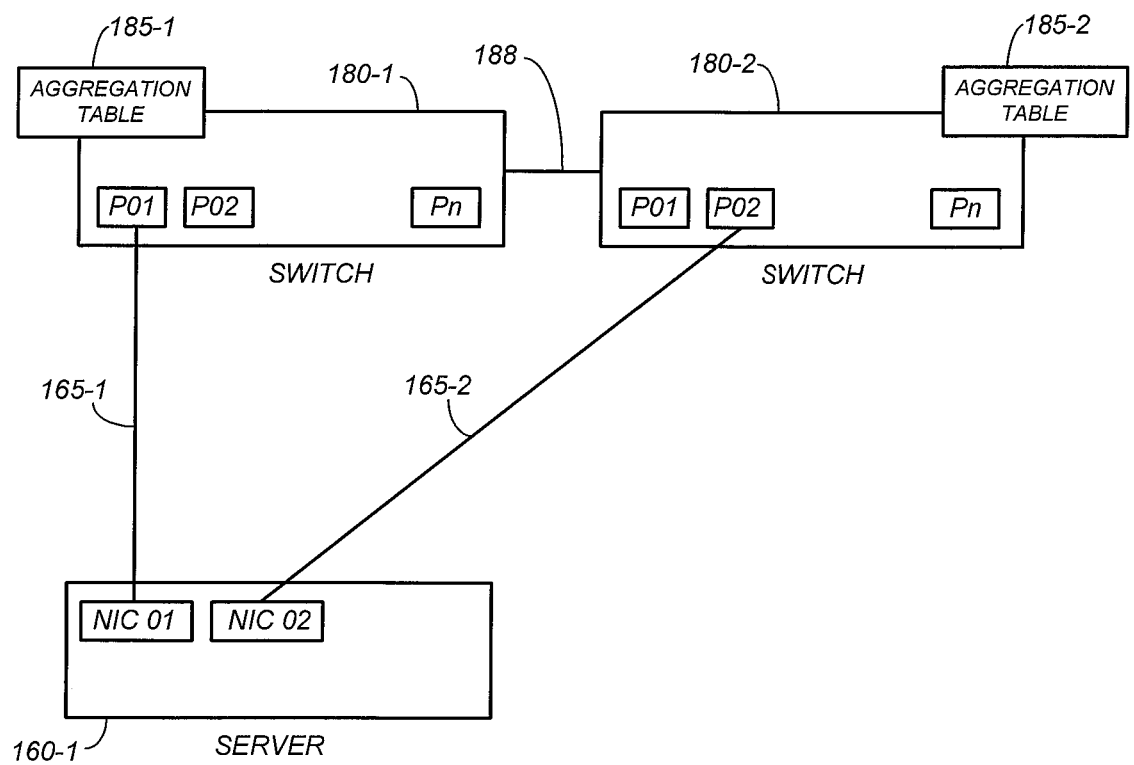
FIG. 3 shows example link connections between a server computer and network switches in the computer network of FIG. 2, in accordance with an embodiment of the present invention.

FIG. 3 shows example link connections between the server computer 160-1 and the network switches 180-1 and 180-2 in accordance with an embodiment of the present invention. The link connections between the server computer 160-2 and the network switches 180-1 and 180-2 are similar, and are thus omitted in FIG. 3 for clarity of illustration.

In the example of FIG. 3, the link 165-1 connects the NIC port NIC 01 of the server computer 160-1 to the switch port P01 of the network switch 180-1, and the link 165-2 connects the NIC port NIC 02 of the server computer 160-1 to the switch port P02 of the network switch 180-2. At the server computer 160-1, the NIC ports NIC 01 and NIC 02 are members of the same LACP port channel aggregation 170-1 (see FIG. 2, 170-1).

In one embodiment, the pair of network switches 180-1 and 180-2 are configured as MLAG peer network devices and share the same system identifier. This allows the server computer 160-1 to treat the pair of network switches 180-1 and 1802 as a single network switch for aggregation setup. In the example of FIG. 3, the switch port P01 of the network switch 180-1 and the switch port P02 of the network switch 180-2 belong to the same MLAG port channel aggregation 175-1. The network switches 180-1 and 180-2 may communicate with each other by way of a dedicated inter-peer link (IPL) 188.

Each MLAG port channel aggregation may have an addressable port channel number and an associated system identifier that identifies the network switches that house the switch ports that are members of the MLAG port channel aggregation. Each MLAG port channel aggregation may also have a unique aggregation key for identifying the MLAG port channel aggregation. An MLAG port channel aggregation would have the same port channel number and same system identifier regardless of the network switch 180 that created the MLAG port channel aggregation.

A network switch 180 is assigned an MLAG peer role, which identifies the network switch as either a primary switch or a secondary switch. In one embodiment, the network switch with the lower Media Access Control (MAC) address is designated as the primary switch, and the other network switch is designated as the secondary switch. Each network switch 180 is also assigned a unique switch identifier. The peer role and switch identifier of a network switch 180 may be designated during MLAG establishment. In the present disclosure, for illustration purposes, the network switch 180-1 is assigned the switch identifier 1 and designated as a primary switch, and the network switch 180-2 is assigned the switch identifier 2 and designated as a secondary switch.

In one embodiment, a primary switch does not follow MLAG configurations made by the secondary switch. That is, the primary switch creates port channel aggregations without regard to port channel aggregations created by the secondary switch, and the secondary switch simply follows port channel aggregations made by the primary switch. In one embodiment, if a port channel exists only on a secondary switch, the secondary switch may create the port channel regardless of the primary switch.

Generally speaking, the procedure for configuring port channel aggregations in network switches involves many steps. Configuring a port channel aggregation involves creating the port channel aggregation, adding member switch ports to the port channel aggregation, and enabling MLAG on the port channel aggregation. These steps need to be repeated for each switch port on each network switch. In some computer networks, there may be 20 to 40 server computers that are connected to a network switch. This requires configuring 20 to 40 port channel aggregations in any network switch, increasing the complexity of the configuration procedure. Worse, an incorrect configuration prevents data packets from being switched correctly to their destination, resulting in hours of network downtime and troubleshooting.

As shown in FIG. 2, each network switch 180 may include aggregation modules 187 (187-1, 187-2, . . . ), which are adapted to perform automatic link aggregation configuration from received link aggregation control packets. A link aggregation control packet, such as an LACP packet, contains link aggregation information. The link aggregation information in an LACP packet may include an actor aggregation key (aggregation key on the sender side), an actor system identifier (system identifier of the sender), a partner aggregation key (aggregation key on the receiver side), and a partner system identifier (system identifier of the receiver). As a particular example, for an LACP packet received by the network switch 180-1 from the server computer 160-1, the actor aggregation key is the aggregation key for the port channel aggregation 170-1, the actor system identifier is the system identifier of the server computer 160-1, the partner aggregation key is the aggregation key for the MLAG port channel aggregation 175-1, and the partner system identifier is the system identifier of the network switch 180-1.

In one embodiment, a network switch 180 receives network traffic at a switch port. The aggregation modules 187 are adapted to receive a link aggregation control packet at the switch port, and create a port channel aggregation including the switch port when the switch port is not part of a port channel aggregation.

Figure 4:
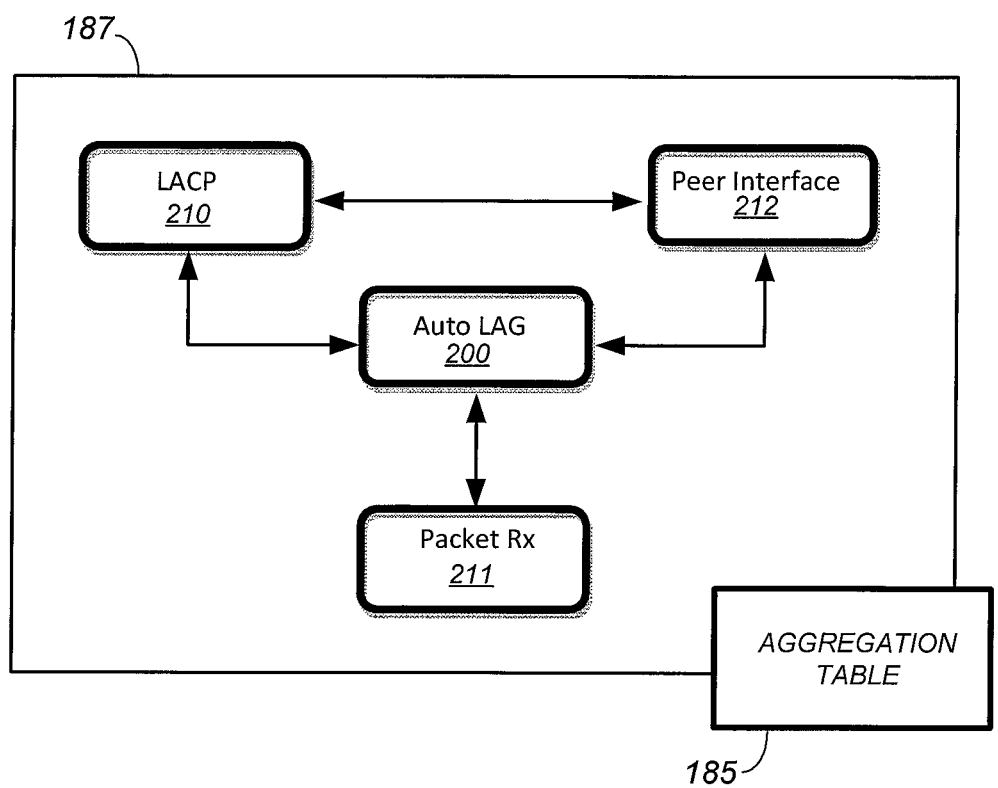
FIG. 4 shows a logical diagram of aggregation modules in accordance with an embodiment of the present invention.

FIG. 4 shows a logical diagram of aggregation modules 187 in accordance with an embodiment of the present invention. Each network switch 180 has its own aggregation modules 187 and aggregation table 185.

In one embodiment, the aggregation modules 187 comprise an LACP module 210, a peer interface 212, a packet receiver 211, and an automatic link aggregation (LAG) module 200. In one embodiment, the components of the aggregation modules 187 are implemented in software. In other embodiments, one or more components of the aggregation modules 187 are implemented in hardware (e.g., application-specific integrated circuit; field programmable gate array; logic gates) or a combination of hardware and software.

Conventional network devices that are compliant with the LACP and support MLAG have an LACP module, peer interface, and packet receiver. In embodiments of the present invention, the LACP module 210, peer interface 212, and packet receiver 211 perform the functionality of corresponding components in LACP-compliant network devices, but are modified to work with an automatic LAG module 200. Such modifications may include adding one or more interfaces to send and receive data to and from the automatic LAG module 200 and additional logic or procedure to work with the automatic LAG module 200 as described below.

In one embodiment, the packet receiver 211 handles the receiving and processing of control packets received at a switch port of the network switch 180. The packet receiver 211 may be implemented from a pre-existing packet receiver by modifying the pre-existing packet receiver to forward received LACP packets to the automatic LAG module 200, instead of directly to the LACP module 210.

In one embodiment, the LACP module 210 manages the creation and deletion of port channel aggregations and processing of LACP packets for active switch port channel interfaces. The LACP module 210 communicates with the peer network switch 180 by way of the peer Interface 212. The LACP module 210 may be implemented from a pre-existing LACP module by modifying the pre-existing LACP module to communicate with the automatic LAG module 200. In conventional network devices that support LACP, the pre-existing LACP module receives configuration instructions from manual keyboard entries made by a user or from a management interface, such by Simple Network Management Protocol (SNMP). In embodiments of the present invention, a pre-existing LACP module is modified to receive configuration instructions from the automatic LAG module 200. The automatic LAG module 200 may create a port channel aggregation, add a member switch port to the port channel aggregation, remove a member switch port from the port channel aggregation, and delete the port channel aggregation by so instructing the LACP module 210.

In one embodiment, the peer interface 212 manages the communication between peer network devices to create, delete, and maintain MLAG interfaces across peers. The peer interface 212 also maintains the list of MLAG interfaces active in peer network devices. The peer interface 212 may be implemented from a pre-existing peer interface by modifying the pre-existing peer interface to notify the automatic LAG module 200 on the reception of peer MLAG changes and also to respond to queries requested by the automatic LAG module 200. The peer interface 212 and the LACP module 210 update the aggregation table 185 for any changes to MLAG configurations.

In one embodiment, the automatic LAG module 200 is adapted to receive LACP packets from the packet receiver 211 and to automatically perform MLAG configuration based on the received LACP packets. The automatic LAG module 200 may perform MLAG configuration based on received LACP packets by creating and deleting port channel aggregations and adding a switch port to a port channel aggregation.

Figure 5:
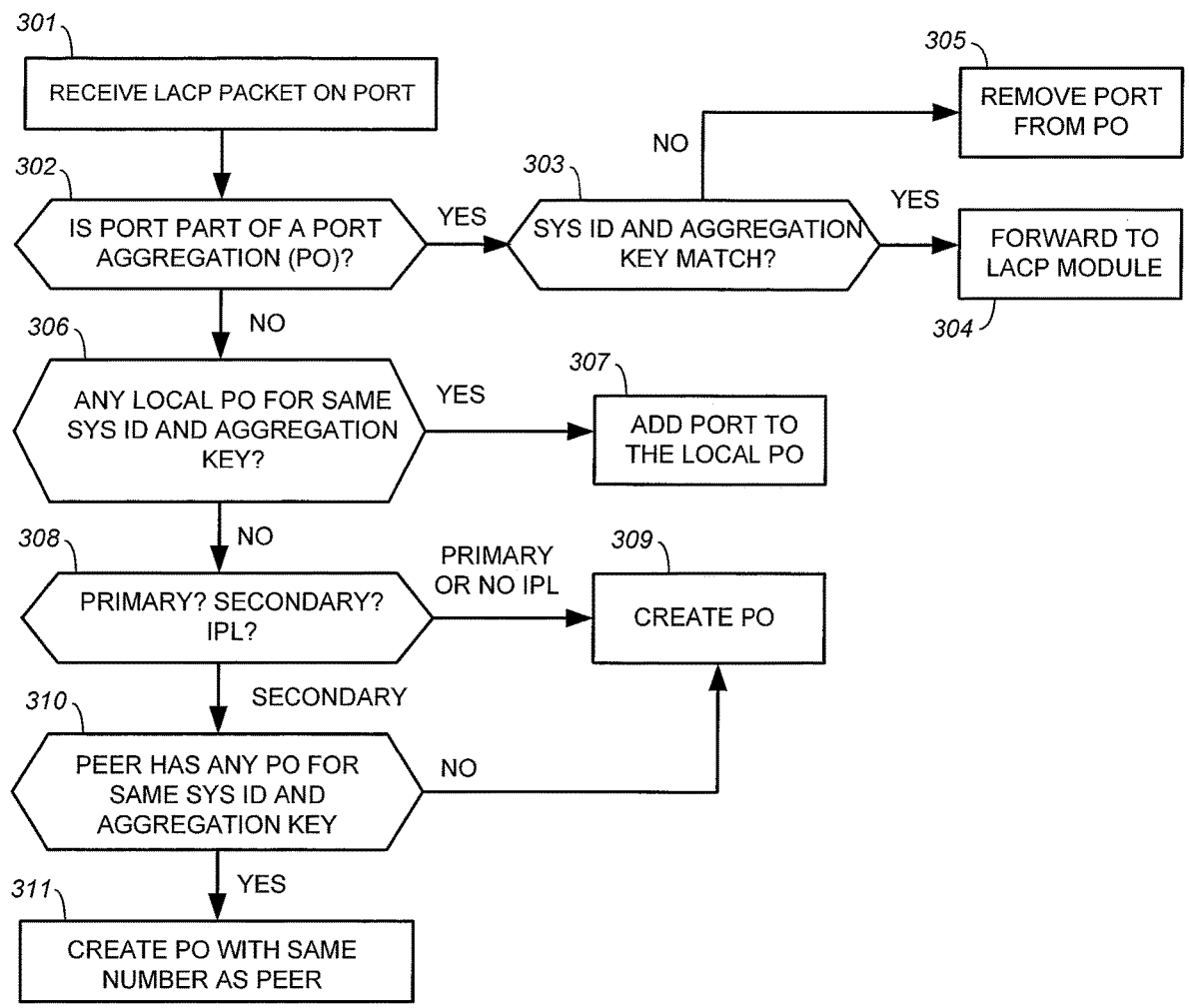
FIG. 5 shows a flow diagram of a computer-implemented method of automatically performing MLAG configurations in accordance with an embodiment of the present invention.

FIG. 5 shows a flow diagram of a computer-implemented method of automatically performing MLAG configurations in accordance with an embodiment of the present invention. The method of FIG. 5 may be performed by the automatic LAG module 200 in conjunction with previously disclosed components. Other components may also be employed without detracting from the merits of the present invention In the example of FIG. 5, an LACP packet is received at a switch port of a network switch 180 (step 301). The packet receiver 211 provides the LACP packet to the automatic LAG module 200.

The automatic LAG module 200 checks if the switch port is a member of a currently-existing port channel aggregation (step 302). The automatic LAG module 200 may check the switch port against member switch ports of port channel aggregations to do so.

When the switch port is a member of a port channel aggregation, the automatic LAG module 200 checks if the partner system identifier and partner aggregation key indicated in the LACP packet match those of the port channel aggregation (step 303). When the port channel aggregation and LACP packet have matching partner system identifier and partner aggregation key, the automatic LAG module 200 deems the LACP packet to be a regular LACP handshake for an existing port channel aggregation and accordingly forwards the LACP packet to the LACP module 210 (step 303 to step 304). Otherwise, the automatic LACP module 200 declares a mismatch, and accordingly removes the switch port from the port channel aggregation (step 303 to step 305). The LACP module 200 deletes the port channel aggregation when the port channel aggregation does not have any remaining member switch ports.

When the switch port is not a member of any port channel aggregation, the automatic LAG module 200 checks for presence of any local (i.e., in the same network switch 180) port channel aggregation having the same partner system identifier and partner aggregation key as in the LACP packet (step 306). If so, the automatic LAG module 200 adds the switch port to the local port channel aggregation (step 307).

When there is no local port channel aggregation having the same partner system identifier and partner aggregation key as in the LACP packet (step 306 to step 308), the automatic LAG module 200 queries the peer interface 212 to determine the peer role (i.e., whether primary or secondary) of the network switch 180 that received the LACP packet and the status of the inter-peer link 188 (step 308).

When the inter-peer link 188 is not active (indicating there is no active corresponding peer network switch) or the network switch 180 is a primary switch (step 308 to step 309), the automatic LAG module 200 requests the LACP module 210 to create a new port channel aggregation and add the switch port to the new port channel aggregation (step 309). In one embodiment, the port channel number of the new port channel aggregation may be in the form of "<sw-id><ifndex>", where sw-id is the switch identifier of the network switch 180 and "ifndex" is the switch port number.

When the network switch 180 is a secondary switch (step 308 to step 310), the automatic LAG module 200 queries the peer interface 212 to determine if the peer network switch has a port channel aggregation with the same partner system identifier and partner aggregation key as in the LACP packet. In other words, when the network switch 180 is a secondary switch, the automatic LAG module 200 checks whether the primary switch has a port channel aggregation with the same partner system identifier and partner aggregation key as in the LACP packet. If so, the automatic LAG module 200 creates a port channel aggregation with the same port channel number as that of the primary network switch and adds the switch port to that port channel aggregation (step 310 to step 311). If not, the automatic LAG module 200 requests the LACP module 210 to create a new port channel aggregation and adds the switch port to the new port channel aggregation (step 310 to step 309). In one embodiment, the new port channel aggregation has the port channel number "<sw-id><ifndex>", where sw-id is the switch identifier of the network switch 180 and "ifndex" is the switch port number.

As a particular example, assuming the network switch 180-2 is a secondary switch that received the LACP packet, the automatic LAG module 200 of the network switch 180-2 queries its peer interface 212 to determine if the network switch 180-1 (the primary switch) has a port channel aggregation with the same partner system identifier and partner aggregation key as in the LACP packet (step 308 to step 310). If so, the automatic LAG module 200 creates a port channel aggregation with the same port channel number as that of the network switch 180-1 and adds the switch port to that port channel aggregation (step 310 to step 311). If not, the automatic LAG module 200 requests the LACP module 210 to create a new port channel aggregation and adds the switch port to the new port channel aggregation (steps 310 to step 309).

Figure 6:
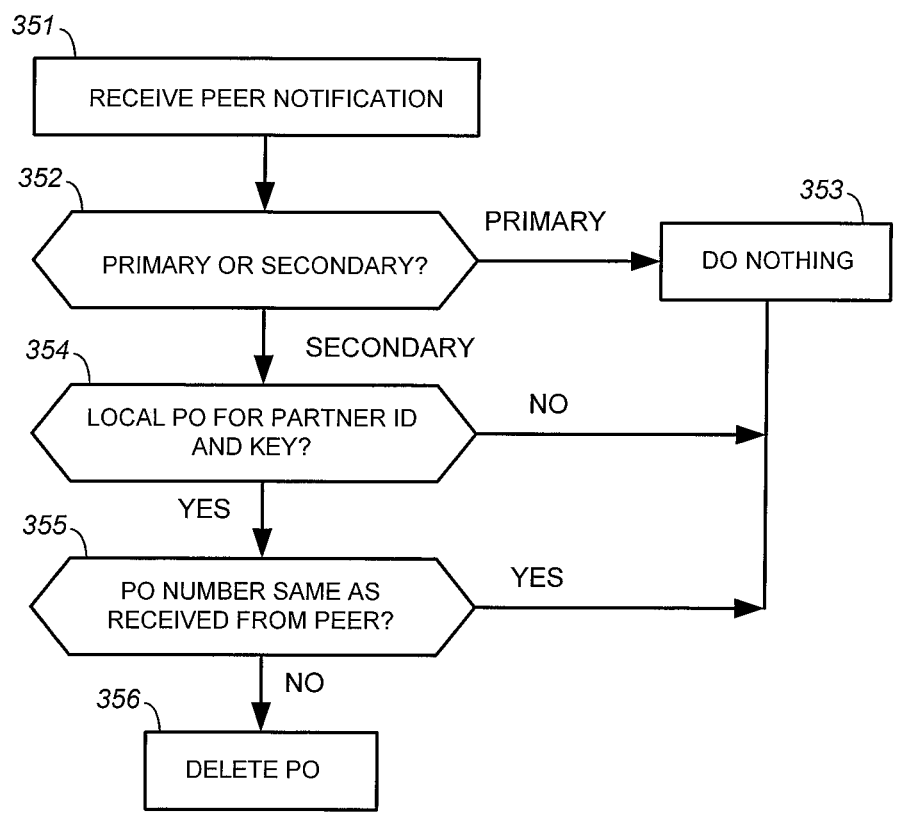
FIG. 6 shows a flow diagram of a method of maintaining MLAG configurations between a primary network switch and a secondary network switch in accordance with an embodiment of the present invention.

FIG. 6 shows a flow diagram of a method of maintaining MLAG configurations between a primary network switch and a secondary network switch in accordance with an embodiment of the present invention. The method of FIG. 6 may be performed by the automatic LAG module 200 in conjunction with previously disclosed components. Other components may also be employed without detracting from the merits of the present invention.

In one embodiment, a peer interface 212 sends a peer notification to the automatic LAG module 200 whenever the peer interface 212 receives a port channel aggregation update from a peer network switch. As a particular example, a peer interface 212 of the network switch 180-1 may receive a port channel aggregation update (e.g., port channel aggregation creation or deletion) from a peer interface 212 of the network switch 180-2. In that example, the peer interface 212 of the network switch 180-1 may notify the automatic LAG module 200 of the network switch 180-1 by sending a peer notification. In one embodiment, a peer notification includes a partner system identifier, partner aggregation key, and port channel number of the port channel aggregation that is the subject of the port channel aggregation update.

In the example of FIG. 6, an automatic LAG module 200 receives a peer notification from a peer interface 212 (step 351). The automatic LAG module 200 responds to the peer notification depending on the peer role of the network switch 180. When the network switch 180 is a primary switch (step 352 to step 353), the automatic LAG module 200 simply discards the peer notification (step 353). This is because a primary switch makes MLAG configurations without regard to the secondary switch it is peered with.

When the network switch 180 is a secondary switch, the automatic LAG module 200 checks for an existing local port channel aggregation with the same partner system identifier and partner aggregation key indicated in the peer notification (step 352 to step 354). The automatic LAG module 200 discards the peer notification if there is no local port channel aggregation with the same partner system identifier and partner aggregation key as those indicated in the peer notification (step 354 to step 353).

When the network switch 180 is a secondary switch and there is a local port channel aggregation with the same partner system identifier and partner aggregation key as those indicated in the peer notification (step 354 to step 355), the automatic LAG module 200 checks if the port channel number of the local port channel aggregation matches that indicated in the peer notification (step 355). If so, the automatic LAG module 200 simply discards the peer notification (step 355 to step 353). Otherwise, when the port channel number of the local port channel aggregation does not match that indicated in the peer notification (step 355 to step 356), the automatic LAG module 200 deletes the local port channel aggregation.

In one embodiment, the peer interface 212 provides the status of the inter-peer link 188 to the automatic LAG module 200. When the automatic LAG module 200 finds that the inter-peer link 188 is down, the automatic LAG module 200 deletes all of the port channel aggregations created by the automatic LAG module 200. This deletion allows the port channel aggregations to be automatically re-configured correctly after the inter-peer link 188 goes down. The automatic LAG module 200 may also delete a port channel aggregation created by the automatic LAG module 200 when the port channel aggregation goes down due to missing LACP packets. In general, the actions performed by the automatic LAG module 200 to recover from an inter-peer link going down or other system failure may depend on the particulars of the computer network.

Systems and methods for automatically configuring multi-chassis link aggregations in a computer network have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of automatically configuring a multi-chassis link aggregation in network switches, the method comprising:
   receiving a first network traffic at a first switch port of a first network switch;
   receiving a second network traffic at a first switch port of a second network switch;
   extracting a control packet from the first network traffic received at the first switch port of the first network switch; and
   configuring, in the first network switch, a multi-chassis link aggregation that includes the first switch port of the first network switch and the first switch port of the second network switch based on a partner aggregation key and a partner system identifier indicated in the control packet extracted from the first network traffic,
   wherein the partner aggregation key and the partner system identifier corresponds to the multi-chassis link aggregation,
   wherein configuring the multi-chassis link aggregation comprises: adding the first switch port of the first network switch to the multi-chassis link aggregation in response to detecting that the first switch port of the first network switch is not a member of the multi-chassis link aggregation, and the partner aggregation key and the partner system identifier indicated in the extracted control packet are same as those of the multi-chassis link aggregation.

2. The method of claim 1, wherein the first network switch is a primary switch and the second network switch is a secondary switch in a multi-chassis peer arrangement, and the method further comprises:
   creating the multi-chassis link aggregation in response to detecting that there is no port channel aggregation in the first network switch with a same partner aggregation key and partner system identifier as those indicated in the extracted control packet.

3. The method of claim 1, wherein the first network switch is a secondary switch and the second network switch is a primary switch in a multi-chassis peer arrangement, and the method further comprises:
   creating, in the first network switch, the multi-chassis link aggregation in response to detecting that there is no port channel aggregation in the first and second network switches with a same partner aggregation key and partner system identifier as those indicated in the extracted control packet.

4. The method of claim 1, wherein the first network switch is a secondary switch and the second network switch is a primary switch in a multi-chassis peer arrangement, and the method further comprises:
   creating, in the first network switch, the multi-chassis link aggregation with a same port channel number as another multi-chassis link aggregation in the second network switch in response to detecting that the other multi-chassis link aggregation in the second network switch has a same partner aggregation key and partner system identifier as those indicated in the extracted control packet.

5. The method of claim 1, further comprising:
   receiving, in the first network switch, a peer notification from the second network switch, the peer notification involving an update to another multi-chassis link aggregation; and
   discarding the peer notification when the first network switch is a primary switch in a multi-chassis peer arrangement and the second network switch is a secondary switch in the multi-chassis peer arrangement.

6. The method of claim 1, further comprising:
   receiving, in the first network switch, a peer notification from the second network switch, the peer notification involving an update to another multi-chassis link aggregation; and
   deleting the multi-chassis link aggregation in the first network switch when the first network switch is a secondary switch in a multi-chassis peer arrangement, the second network switch is a primary switch in the multi-chassis peer arrangement, and the multi-chassis link aggregation in the first network switch has a same partner system identifier and partner aggregation key as the other multi-chassis link aggregation in the second network switch.

7. A network switch comprising:
   a processor; and
   a memory that is configured to store instructions that when executed by the processor cause the network switch to:
   receive network traffic at a first switch port of the network switch;
   extract a control packet from the first network traffic received at the first switch port of the network switch; and
   configure a multi-chassis link aggregation that includes the switch port of the network switch and a first switch port of another network switch based on a partner aggregation key and a partner system identifier indicated in the control packet extracted from the network traffic,
   wherein the partner aggregation key and the partner system identifier correspond to the multi-chassis link aggregation,
   wherein the instructions stored in the memory, when executed by the processor, further cause the network switch to: add the first switch port of the network switch to the multi-chassis link aggregation in response to detecting that the first switch port of the first network switch is not a member of the multi-chassis link aggregation, and the partner aggregation key and the partner system identifier indicated in the extracted control packet are same as those of the multi-chassis link aggregation.

8. The network switch of claim 7, wherein the instructions stored in the memory, when executed by the processor, further cause the network switch to:
   create the multi-chassis link aggregation in response to detecting that there is no port channel aggregation in the network switch with a same partner aggregation key and partner system identifier as those indicated in the extracted control packet,
   wherein the network switch is a primary switch and the other network switch is a secondary switch in a multi-chassis peer arrangement.

9. The network switch of claim 7, wherein the instructions stored in the memory, when executed by the processor, further cause the network switch to:
- create, in the network switch, the multi-chassis link aggregation in response to detecting that there is no port channel aggregation in the network switch and in the other network switch with a same partner aggregation key and partner system identifier as those indicated in the extracted control packet,
- wherein the network switch is a secondary switch and the other network switch is a primary switch in a multi-chassis peer arrangement.

10. The network switch of claim 7, wherein the instructions stored in the memory, when executed by the processor, further cause the network switch to:
- create, in the network switch, the multi-chassis link aggregation with a same port channel number as another multi-chassis link aggregation in the other network switch in response to detecting that the other multi-chassis link aggregation in the other network switch has a same partner aggregation key and partner system identifier as those indicated in the extracted control packet,
- wherein the network switch is a secondary switch and the other network switch is a primary switch in a multi-chassis peer arrangement.

* * * * *